(12) United States Patent
Wu et al.

(10) Patent No.: US 12,235,702 B2
(45) Date of Patent: Feb. 25, 2025

(54) CHIP, SERIES POWER SUPPLY CIRCUIT, DATA PROCESSING DEVICE, AND COMPUTER SERVER

(71) Applicant: Bitmain Technologies Inc., Beijing (CN)

(72) Inventors: Fei Wu, Beijing (CN); Lijun Wang, Beijing (CN)

(73) Assignee: BITMAIN TECHNOLOGIES INC., Beijing (CN)

(*) Notice: Subject to any disclaimer, the term of this patent is extended or adjusted under 35 U.S.C. 154(b) by 39 days.

(21) Appl. No.: 18/201,749

(22) Filed: May 24, 2023

(65) Prior Publication Data
US 2023/0297153 A1 Sep. 21, 2023

Related U.S. Application Data

(63) Continuation of application No. PCT/CN2021/131286, filed on Nov. 17, 2021.

(30) Foreign Application Priority Data

Nov. 25, 2020 (CN) .......................... 202011341075.8

(51) Int. Cl.
G06F 1/32 (2019.01)
G06F 1/3206 (2019.01)
(52) U.S. Cl.
CPC ................... *G06F 1/3206* (2013.01)

(58) Field of Classification Search
CPC .................................................... G06F 1/3206
See application file for complete search history.

(56) References Cited

U.S. PATENT DOCUMENTS

| 7,502,950 B1 | 3/2009 | Brands | |
|---|---|---|---|
| 2006/0230293 A1* | 10/2006 | Veselic | G06F 1/24 713/300 |
| 2009/0322304 A1* | 12/2009 | Oraw | H02M 3/07 323/312 |

FOREIGN PATENT DOCUMENTS

| CN | 103186219 A | 7/2013 |
| CN | 105045364 A | 11/2015 |
| CN | 106774767 A | 5/2017 |
| CN | 107272797 A | 10/2017 |
| CN | 107621865 A | 1/2018 |
| CN | 208126335 U | 11/2018 |

* cited by examiner

*Primary Examiner* — Stefan Stoynov
(74) *Attorney, Agent, or Firm* — MASCHOFF BRENNAN; Liang Huang

(57) ABSTRACT

Provided are a chip, a series power supply circuit, a data processing device, and a computer server. The chip includes a plurality of units to be powered, the plurality of units to be powered are connected in parallel, and a voltage domain forms on each unit to be powered. Each unit to be powered is connected to a voltage regulation unit in series, and during power-on of the chip, the voltage regulation unit is regulated to control power-on time of the plurality of units to be powered.

20 Claims, 5 Drawing Sheets

CHIP, SERIES POWER SUPPLY CIRCUIT, DATA PROCESSING DEVICE, AND COMPUTER SERVER

CROSS-REFERENCE TO RELATED APPLICATIONS

The present application is a U.S. continuation under 35 U.S.C. § 111(a) of International Application No. PCT/CN2021/131286 filed on Nov. 17, 2021, which claims priority to Chinese Patent Application No. 202011341075.8, filed with the China National Intellectual Property Administration on Nov. 25, 2020 and entitled "CHIP, SERIES POWER SUPPLY CIRCUIT, DATA PROCESSING DEVICE, AND COMPUTER SERVER". The contents of these applications are incorporated herein by reference in their entirety for all purposes.

TECHNICAL FIELD

The present disclosure relates to the field of power supply technologies.

BACKGROUND

With the development of semiconductor processes, a chip has an increasingly low operating supply voltage and an increasingly high operating current. To maximize conversion efficiency of a power supply, in the prior art, a power supply method based on series-connected chips is used on a printed circuit board (PCB), that is, a plurality of chips are connected in series, forming multiple stages of series-connected voltage domains between a power input terminal and a ground terminal. Such an on-chip series structure can increase a power supply voltage and reduce a power supply current in a condition that power consumption of the machine is fixed, thereby improving system efficiency. However, when chips are powered on too slowly, a voltage and a current in the structure of the series-connected chips may be nonlinear during power-on, resulting in an imbalance between voltage domains of the chips during the power-on. Therefore, how to ensure a balance between voltage domains during power-on of chips becomes an urgent problem to be resolved.

SUMMARY

Embodiments of the present application provide a chip, a series power supply circuit, a data processing device, and a computer server.

According to an aspect, an embodiment of the present application provides a chip. The chip includes a plurality of units to be powered, the plurality of units to be powered are connected in parallel, and a voltage domain forms on each unit to be powered. Each unit to be powered is connected to a voltage regulation unit in series, and during power-on of the chip, the voltage regulation unit is regulated to control power-on time of the plurality of units to be powered.

According to another aspect, an embodiment of the present application further provides a series power supply circuit. The series power supply circuit includes a power terminal, a ground terminal, and a plurality of chips described above, and the plurality of chips are connected in series between the power terminal and the ground terminal.

According to yet another aspect, an embodiment of the present application further provides a data processing device, including a case, a control board inside the case, an expansion board connected to the control board, and a computing board connected to the expansion board, where the computing board includes a chip described above, or the computing board includes a series power supply circuit described above.

According to still another aspect, an embodiment of the present application further provides a computer server, including a motherboard, a memory disk and a hard disk that are electrically connected to the motherboard, a power supply that supplies power to the motherboard, and a central processing unit, where the central processing unit includes a chip described above, or the central processing unit includes a series power supply circuit described above.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person skilled in the art may derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The flowcharts shown in the accompanying drawings are merely examples for description, but do not necessarily include all content or operations/steps, and the operations/steps are not necessarily performed in the order described. For example, some operations/steps may alternatively be split, combined, or partially combined, and therefore an actual order of execution may change depending on an actual situation.

It should be understood that terms used in this specification of the present disclosure are only for the purpose of describing specific embodiments, and are not intended to limit the present disclosure. As used in this specification and the appended claims of the present disclosure, the singular forms "a", "an", and "the" are intended to include plural forms, unless otherwise explicitly specified in the context.

It should be further understood that the term "and/or" used in this specification and the appended claims of the present disclosure indicates any combination and all possible combinations of one or more items listed in association, and includes the combinations.

Some implementations of the present disclosure are described in detail below with reference to the accompanying drawings. The following embodiments and features in the embodiments may be mutually combined in case of no conflict.

Figure 1:
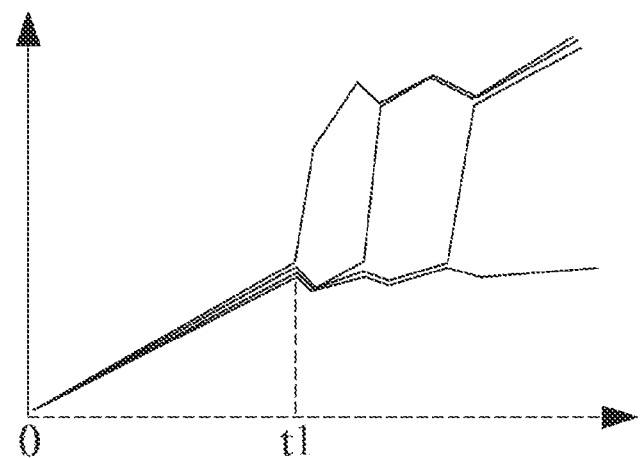
FIG. 1 is a diagram of voltage fluctuations corresponding to voltage domains during power-on of a chip.

To maximize conversion efficiency of a power supply, in the prior art, a power supply method based on series-connected chips is used on a PCB, that is, a plurality of chips are connected in series, forming multiple stages of series-connected voltage domains between a power input terminal and a ground terminal. Such an on-chip series structure can increase a power supply voltage and reduce a power supply current in a condition that power consumption of the machine is fixed, thereby improving system efficiency. However, when chips are powered on too slowly, a voltage and a current in the structure of the series-connected chips may be nonlinear during power-on, resulting in an imbalance between voltage domains of the chips during the power-on. For example, FIG. 1 is a diagram of voltage fluctuations corresponding to four voltage domains during power-on of a chip, where a horizontal coordinate represents a time value, and a vertical coordinate represents a voltage value. It can be learned from FIG. 1 that the four voltage domains of the chip are balanced during a time period of 0 to t1, and the four voltage domains of the chip are unbalanced after the time t1.

To alleviate, mitigate or resolve the foregoing problem, the embodiments of the present disclosure provide a chip, a series power supply circuit, a data processing device, and a computer server, to quickly power on a chip, thereby ensuring a balance between voltage domains during the power-on of the chip.

Figure 2:
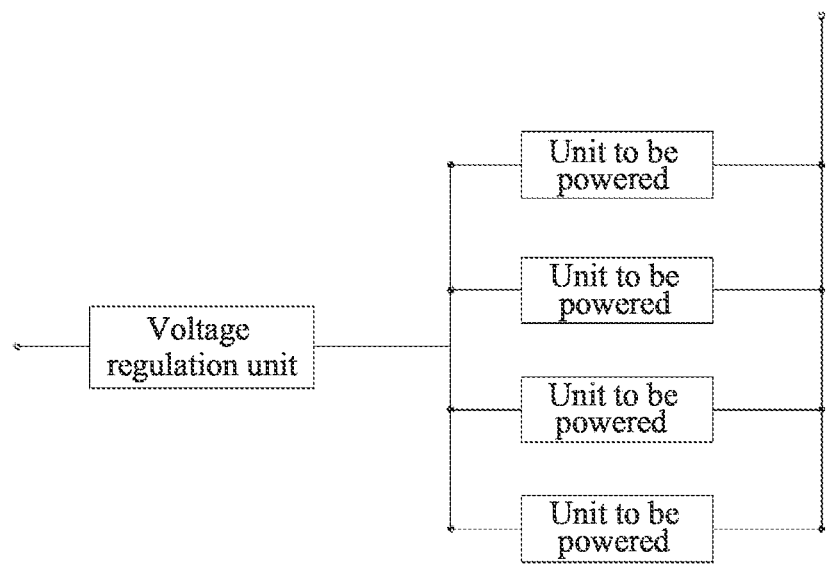
FIG. 2 is a schematic diagram of a structure of a chip according to an embodiment of the present disclosure.

FIG. 2 is a schematic diagram of a structure of a chip according to an embodiment of the present disclosure. As shown in FIG. 2, the chip includes a plurality of units to be powered and a voltage regulation unit. Each unit to be powered is connected to the voltage regulation unit in series, the plurality of units to be powered are connected in parallel, and a voltage domain forms on each unit to be powered.

During power-on of the chip, the voltage regulation unit is regulated to control power-on time of the plurality of units to be powered. For example, a threshold corresponding to the power-on time of the units to be powered is preset. In some embodiments, the threshold is set to 500 μs. It may be understood that the threshold may be flexibly set based on an actual situation. A specific value of the threshold is not limited herein. During the power-on of the chip, the voltage regulation unit is regulated to control the power-on time of the plurality of units to be powered to be less than or equal to the threshold. For example, if the threshold is set to 500 μs, during the power-on of the chip, the voltage regulation unit is regulated to control the power-on time of the plurality of units to be powered to be within 500 μs.

The power-on time of the plurality of units to be powered is controlled, for example, the power-on time of the plurality of units to be powered is controlled to be within 500 μs. This avoids nonlinearity of a voltage and a current and an imbalance between voltage domains of the chip when the chip is powered on too slowly. Therefore, the chip can be quickly powered on, thereby ensuring a balance between voltage domains during the power-on of the chip.

In some embodiments, the voltage regulation unit may be further regulated to control a magnitude of a corresponding impulse current during power-on of the plurality of units to be powered, to avoid damage to the plurality of units to be powered due to an excessively large impulse current. For example, a corresponding impulse current threshold during the power-on of the plurality of units to be powered may be preset. In some embodiments, the impulse current threshold is set to 30 mA. It may be understood that the impulse current threshold may be flexibly set based on an actual situation. A specific value of the impulse current threshold is not limited herein. During the power-on of the chip, the voltage regulation unit is regulated to control the power-on time of the plurality of units to be powered to be less than or equal to the threshold, and control the corresponding impulse current during the power-on of the plurality of units to be powered to be less than or equal to the impulse current threshold. For example, during the power-on of the chip, the voltage regulation unit is regulated to control the power-on time of the plurality of units to be powered to be within 500 μs, and control the corresponding impulse current during power-on of the plurality of units to be powered to be within 30 mA. In this way, the chip can be quickly powered on, thereby ensuring a balance between voltage domains during the power-on of the chip. In addition, this avoids an excessively large impulse current during the power-on of the chip, thereby avoiding damage to the chip caused by an impulse current during the power-on.

Figure 3:
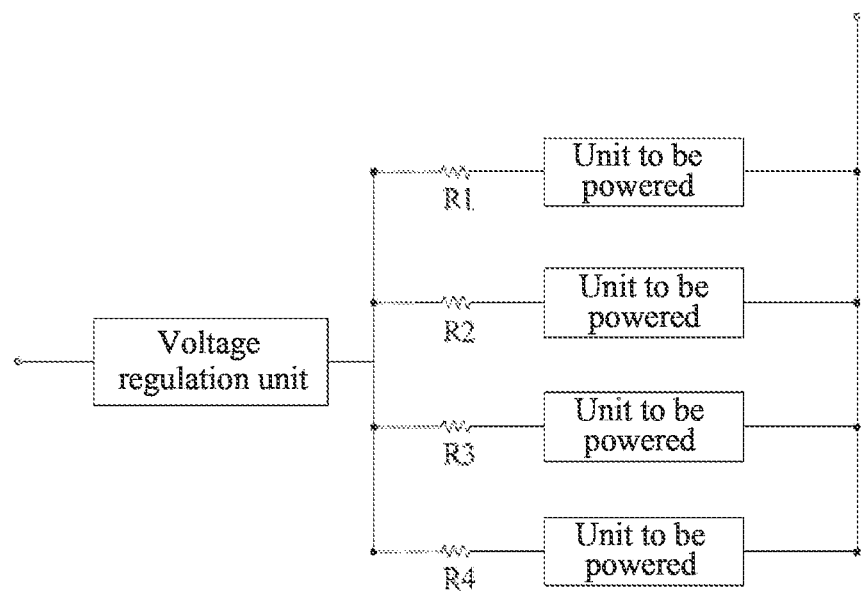
FIG. 3 is a schematic diagram of a structure of another chip according to an embodiment of the present disclosure.

In some embodiments, a voltage regulator resistor is provided on a series circuit of each unit to be powered and the voltage regulation unit. The voltage regulator resistor can better supply power to the unit to be powered in a voltage division mode. For example, as shown in FIG. 3, voltage regulator resistors R1, R2, R3, and R4 are provided on series circuits of four units to be powered and the voltage regulation unit, to supply power to the four units to be powered in a voltage division mode, respectively.

It should be noted that resistances of voltage regulator resistors provided on series circuits of units to be powered and the voltage regulation unit may be the same or different. For example, resistances of the voltage regulator resistors R1, R2, R3, and R4 shown in FIG. 3 may be the same or different.

Figure 4:
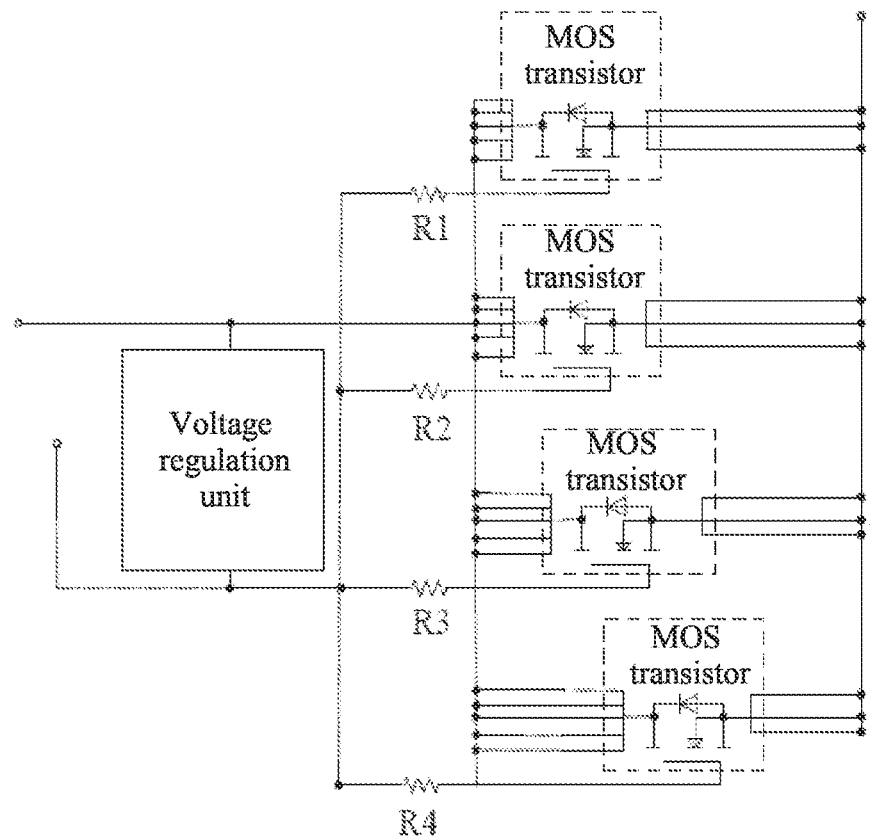
FIG. 4 is a schematic diagram of a structure of another chip according to an embodiment of the present disclosure.

For example, as shown in FIG. 4, the unit to be powered includes a metal oxide semiconductor (MOS) transistor. A gate of each MOS transistor is connected to one terminal of the voltage regulation unit, and a drain or a source of the MOS transistor is connected to the other terminal of the voltage regulation unit. During the power-on of the chip, the voltage regulation unit is regulated to control power-on time of a plurality of MOS transistors to be less than or equal to the threshold. For example, the power-on time of the plurality of MOS transistors is controlled to be within 500 μs.

For example, each unit to be powered may include a chip core, or each unit to be powered may include a plurality of chip cores that are connected in parallel. Each chip core may include a set of computing units and storage units, or may include only a computing unit or a storage unit. A circuit of a chip core in each stage of voltage domain includes a MOS transistor, and a drain or a source of the MOS transistor is connected to an operating power supply.

For example, in addition to the chip core, the chip further includes other modules such as an input/output (I/O) module and a phase locked loop (PLL) module.

Figure 5:
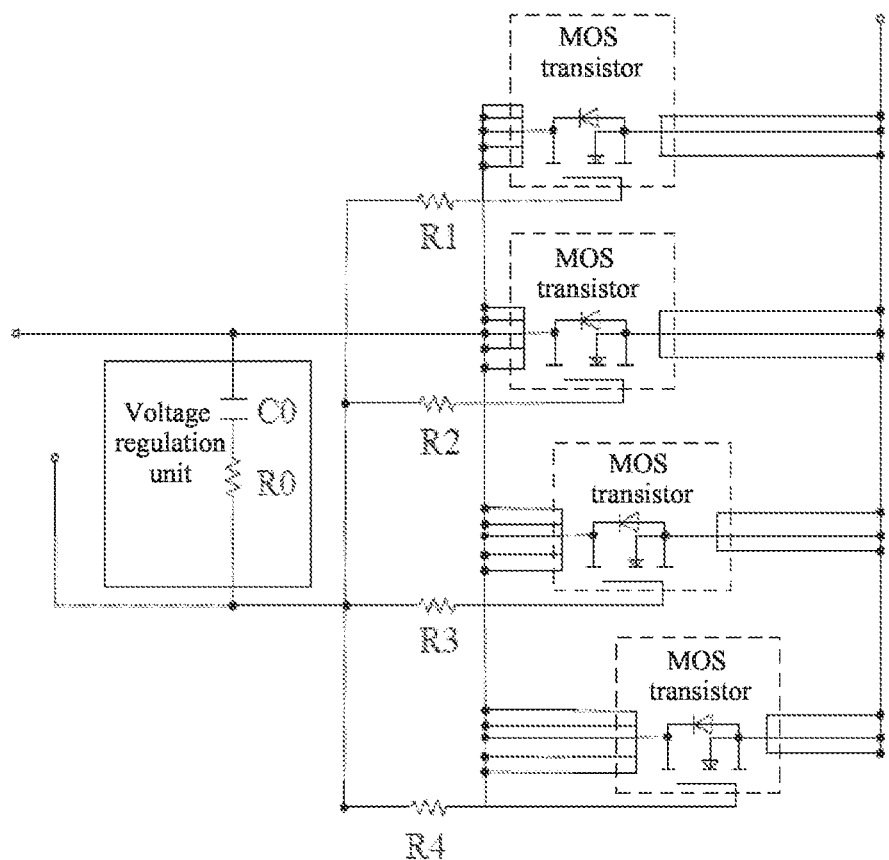
FIG. 5 is a schematic diagram of a structure of another chip according to an embodiment of the present disclosure.

In an embodiment, the voltage regulation unit includes at least one resistor and at least one capacitor, where the at least one resistor and the at least one capacitor are connected in series. For example, as shown in FIG. 5, the voltage regulation unit includes a resistor R0 and a capacitor C0, where the resistor R0 and the capacitor C0 are connected in series. The resistor R0 is connected to a gate of each MOS transistor, and the capacitor C0 is connected to a drain or a source of each MOS transistor.

For example, the at least one resistor is an adjustable resistor, and the at least one capacitor is a variable capacitor. To be specific, the adjustable resistor may be adjusted to change a resistance of the adjustable resistor, and the variable capacitor may be adjusted to change a capacitance of the variable capacitor. The resistance of the adjustable resistor and/or the capacitance of the variable capacitor are/is adjusted to control the power-on time of the plurality of units to be powered.

For example, a resistance of the resistor R0 and/or a capacitance of the capacitor C0 are/is adjusted to control the power-on time of the plurality of MOS transistors.

The chip in the foregoing embodiments includes a plurality of units to be powered, the plurality of units to be powered are connected in parallel, and a voltage domain forms on each unit to be powered. Each unit to be powered is connected to a voltage regulation unit in series. During power-on of the chip, the voltage regulation unit is regulated to control power-on time of the plurality of units to be powered. In this way, the chip is quickly powered on, thereby ensuring a balance between voltage domains during the power-on of the chip.

Figure 6:
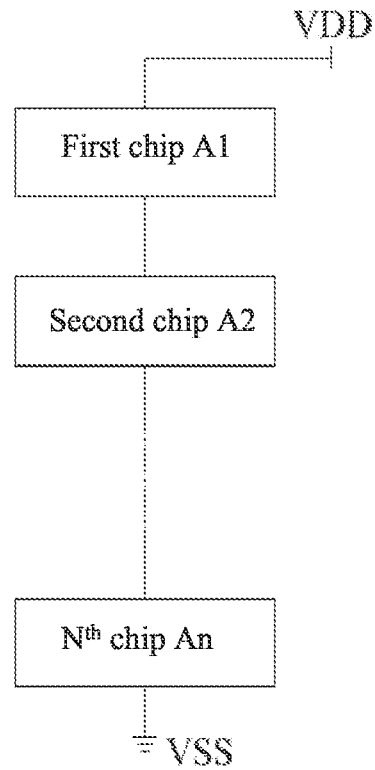
FIG. 6 is a schematic diagram of a structure of a series power supply circuit according to an embodiment of the present disclosure.

An embodiment of the present disclosure further provides a series power supply circuit. FIG. 6 is a schematic diagram of a structure of the series power supply circuit. The series power supply circuit includes a power terminal, a ground terminal, and a plurality of chips, and the plurality of chips are connected in series between the power terminal and the ground terminal. The chip may be a chip of any one of the foregoing embodiments. For ease of description, a quantity of chips is, for example, N (N≥2) in this embodiment, namely, a first chip A1, a second chip A2, . . . , and an $N^{th}$ chip An. The first chip A1, the second chip A2, . . . , and the $N^{th}$ chip An are connected in series. A power terminal VDD is connected to the first chip A1, and a ground terminal VSS is connected to the $N^{th}$ chip An.

When the series power supply circuit shown in FIG. 6 is used for power supply, each chip includes a plurality of units to be powered, the plurality of units to be powered are connected in parallel, and a voltage domain forms on each unit to be powered. Each unit to be powered is connected to a voltage regulation unit in series. During power-on of the chip, the voltage regulation unit is regulated to control power-on time of the plurality of units to be powered. In this way, the chip is quickly powered on, thereby ensuring a balance between voltage domains during the power-on of the chip.

Figure 7:
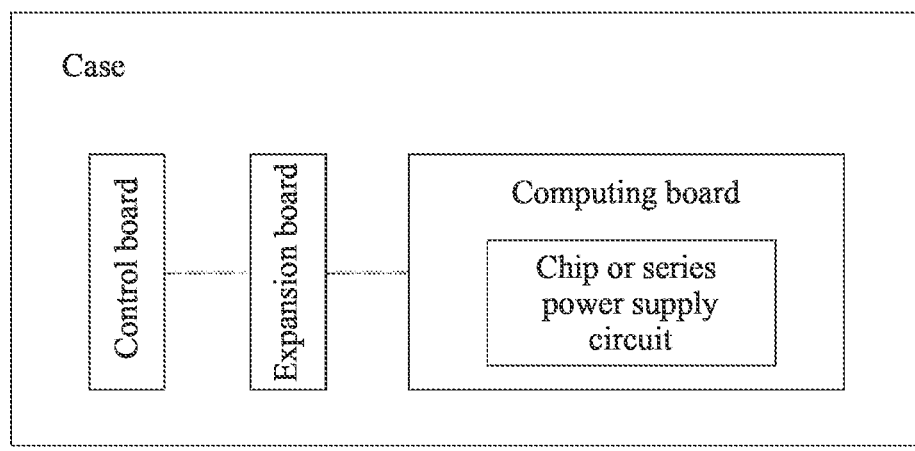
FIG. 7 is a schematic diagram of a structure of a data processing device according to an embodiment of the present disclosure.

An embodiment of the present disclosure further provides a data processing device. FIG. 7 is a schematic diagram of a structure of the data processing device. As shown in FIG. 7, the data processing device includes a case, a control board inside the case, an expansion board connected to the control board, and a computing board connected to the expansion board, where the computing board includes a chip of any one of the foregoing embodiments, or the computing board includes a series power supply circuit of any one of the foregoing embodiments.

In the data processing device, the control board is a control center of the entire data processing device, the control board sends instructions and data through the input/output expansion board, and the computing board is powered through the power supply circuit and is a computing center of the entire data processing device. The control board delivers instructions and data to the expansion board, the expansion board forwards the instructions and data to the computing board, the computing board performs computation and then returns a result to the control board through the expansion board, and the control board uploads the result to the Internet through a wired network interface. In addition, the computing board may further include other units, for example, a power supply protection circuit. The power supply protection circuit may interrupt power from the power supply when overall temperature of the power supply circuit is abnormal.

Figure 8:
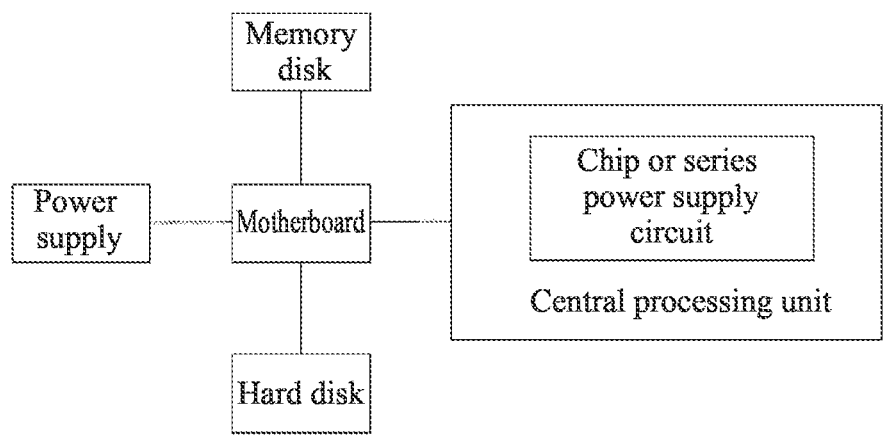
FIG. 8 is a schematic diagram of a structure of a computer server according to an embodiment of the present disclosure.

An embodiment of the present disclosure further provides a computer server. FIG. 8 is a schematic diagram of a structure of the computer server. As shown in FIG. 8, the computer server includes a motherboard, a memory disk and a hard disk that are electrically connected to the motherboard, a power supply that supplies power to the motherboard, and a central processing unit, where the central processing unit includes a chip of any one of the foregoing embodiments, or the central processing unit includes a series power supply circuit of any one of the foregoing embodiments.

The embodiments in this specification are described in a progressive manner. Each embodiment focuses on differences from other embodiments. For a part that is the same or similar between different embodiments, reference may be made between the embodiments. The embodiments of the series power supply circuit, the data processing device, and the computer server essentially correspond to the chip embodiment, and therefore are described briefly. For related parts, refer to descriptions in the chip embodiment.

The description of the present disclosure is given for purposes of illustration and description, and is not exhaustive or intended to limit the present disclosure to the disclosed forms. Many modifications and variations are obvious to a person of ordinary skill in the art. The embodiments are selected and described to better explain the principles and the practical disclosure of the present disclosure, so that a person of ordinary skill in the art can understand the present disclosure and design various embodiments with various modifications for specific uses.

It should be noted that the term "comprise", "include", or any other variant thereof herein is intended to encompass a non-exclusive inclusion, such that a process, method, article, or system that includes a series of elements not only includes those elements, but also includes other elements not explicitly listed, or elements that are inherent to such a process, method, article, or system. In the absence of more restrictions, an element defined by "including a . . . " does not exclude another same element in a process, method, article, or system that includes the element.

The above descriptions are merely the specific implementations of the present disclosure, but the scope of protection of the present disclosure is not limited thereto, persons skilled in the art would readily think of various equivalent modifications or substitutions within the technical scope disclosed in the present disclosure, and these modifications or substitutions should all be intended to be included within the scope of protection of the present disclosure. Therefore, the scope of protection of the present disclosure shall be subject to the scope of protection of the claims.

What is claimed is:

1. A chip comprising:
a plurality of units to be powered, the plurality of units to be powered being connected in parallel, and a voltage domain being formed on each unit to be powered; and
a voltage regulation unit, each unit to be powered being connected to the voltage regulation unit in series,
wherein the voltage regulation unit is configured to be regulated during power-on of the chip to control a power-on time of the plurality of units to be powered.

2. The chip of claim 1, wherein the voltage regulation unit comprises at least one resistor and at least one capacitor, and the at least one resistor and the at least one capacitor are connected in series.

3. The chip of claim 2, wherein the at least one resistor comprises an adjustable resistor, and the at least one capacitor comprises a variable capacitor.

4. The chip of claim 3, wherein at least one selected from a group consisting of the adjustable resistor and the variable capacitor is regulated to control the power-on time of the plurality of units to be powered.

5. The chip of claim 1, wherein the power-on time of the plurality of units to be powered is less than or equal to a threshold.

6. The chip of claim 5, wherein the threshold is set to 500 μs.

7. The chip of claim 1, wherein the unit to be powered comprises a metal oxide semiconductor (MOS) transistor.

8. The chip of claim 7, wherein a gate of each MOS transistor is connected to one terminal of the voltage regulation unit, and a drain or a source of the MOS transistor is connected to another terminal of the voltage regulation unit.

9. The chip of claim 1, wherein a voltage regulator resistor is provided on a series circuit of each unit to be powered and the voltage regulation unit.

10. A series power supply circuit comprising:
a power terminal,
a ground terminal, and
a plurality of chips each comprising:
a plurality of units to be powered, the plurality of units to be powered being connected in parallel, and a voltage domain being formed on each unit to be powered; and
a voltage regulation unit, each unit to be powered being connected to the voltage regulation unit in series,
wherein the voltage regulation unit is configured to be regulated during power-on of the chip to control a power-on time of the plurality of units to be powered,
wherein the plurality of chips are connected in series between the power terminal and the ground terminal.

11. The series power supply circuit of claim 10, wherein the voltage regulation unit comprises at least one resistor and at least one capacitor, and the at least one resistor and the at least one capacitor are connected in series.

12. The series power supply circuit of claim 11, wherein the at least one resistor comprises an adjustable resistor, and the at least one capacitor comprises a variable capacitor.

13. The series power supply circuit of claim 12, wherein at least one selected from a group consisting of the adjustable resistor and the variable capacitor is regulated to control the power-on time of the plurality of units to be powered.

14. The series power supply circuit of claim 10, wherein the power-on time of the plurality of units to be powered is less than or equal to a threshold.

15. The series power supply circuit of claim 10, wherein the unit to be powered comprises a metal oxide semiconductor (MOS) transistor.

16. The series power supply circuit of claim 10, wherein a voltage regulator resistor is provided on a series circuit of each unit to be powered and the voltage regulation unit.

17. A data processing device, comprising:
a case,
a control board inside the case,
an expansion board connected to the control board, and
a computing board connected to the expansion board,
wherein the computing board comprises the chip of claim 1.

18. A data processing device, comprising:
a case,
a control board inside the case,
an expansion board connected to the control board, and
a computing board connected to the expansion board,
wherein the computing board comprises the series power supply circuit of claim 10.

19. A computer server, comprising:
a motherboard,
a memory disk and a hard disk that are electrically connected to the motherboard,
a power supply that supplies power to the motherboard, and
a central processing unit,
wherein the central processing unit comprises the chip of claim 1.

20. A computer server, comprising:
a motherboard,
a memory disk and a hard disk that are electrically connected to the motherboard,
a power supply that supplies power to the motherboard, and
a central processing unit,
wherein the central processing unit comprises the series power supply circuit of claim 10.

* * * * *